(12) United States Patent
Lee et al.

(10) Patent No.: US 10,539,671 B2
(45) Date of Patent: Jan. 21, 2020

(54) DOPPLER DISTRIBUTION MEASUREMENT METHOD IN WIRELESS LAN SYSTEM

(71) Applicant: LG ELECTRONICS INC., Seoul (KR)

(72) Inventors: Kilbom Lee, Seoul (KR); Jiwon Kang, Seoul (KR); Kitae Kim, Seoul (KR); Kungmin Park, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 153 days.

(21) Appl. No.: 15/557,629

(22) PCT Filed: Jan. 20, 2016

(86) PCT No.: PCT/KR2016/000600
§ 371 (c)(1),
(2) Date: Sep. 12, 2017

(87) PCT Pub. No.: WO2016/148384
PCT Pub. Date: Sep. 22, 2016

(65) Prior Publication Data
US 2018/0067203 A1   Mar. 8, 2018

Related U.S. Application Data

(60) Provisional application No. 62/132,518, filed on Mar. 13, 2015.

(51) Int. Cl.
*G01S 13/524* (2006.01)
*G01S 5/02* (2010.01)
(Continued)

(52) U.S. Cl.
CPC .......... *G01S 13/524* (2013.01); *G01S 5/0205* (2013.01); *H04B 7/0619* (2013.01);
(Continued)

(58) Field of Classification Search
CPC ... G01S 13/524; G01S 5/0205; H04B 7/0619; H04W 56/0035; H04W 56/001
See application file for complete search history.

(56) References Cited

U.S. PATENT DOCUMENTS 7,756,003 B1 * 7/2010 Lee ..................... H04L 27/2657
370/208
8,599,817 B2    12/2013 Lee et al.
(Continued)

FOREIGN PATENT DOCUMENTS

CN    104243134 A    12/2014

OTHER PUBLICATIONS

Yu et al., "A Periodogram-based CFO Estimation Scheme for OFDM Systems", The Eighth International Conference on Wireless and Mobile Communications (ICWMC), 2012, ISBN: 978-1-61208-203-5, pp. 17-20.

*Primary Examiner* — Kabir A Timory
(74) *Attorney, Agent, or Firm* — Birch, Stewart, Kolasch & Birch, LLP

(57) ABSTRACT

Disclosed is a Doppler distribution measurement method comprising: receiving a plurality of receive signals that arrive via different RE sets in different paths; measuring CFO values of the plurality of receive signals; selecting the two receive signals in which the difference in value between the CFO values are the greatest, from among the plurality of receive signals; and determining a Doppler shift difference between the selected two receive signals a an effective Doppler distribution.

12 Claims, 6 Drawing Sheets

(a) {B1, B2} case (b) {B1, B3} case (c) {B2, B3} case

(51) Int. Cl.
*H04B 7/06* (2006.01)
*H04W 56/00* (2009.01)
*G01S 5/12* (2006.01)

(52) U.S. Cl.
CPC ..... *H04W 56/001* (2013.01); *H04W 56/0035* (2013.01); *G01S 5/12* (2013.01); *H04B 7/0617* (2013.01)

(56) References Cited

U.S. PATENT DOCUMENTS

2005/0002461 A1* 1/2005 Giannakis ........... H04L 25/0228
375/259
2007/0002800 A1 1/2007 Sondur et al.
2009/0252261 A1 10/2009 Wu et al.

* cited by examiner (a)  (b)

(a) Beam#1 case  (b) Beam#2 case  (c) Beam#3 case (a) {B1, B2} case  (b) {B1, B3} case  (c) {B2, B3} case

DOPPLER DISTRIBUTION MEASUREMENT METHOD IN WIRELESS LAN SYSTEM

CROSS REFERENCE TO RELATED APPLICATIONS

This application is the National Phase of PCT International Application No. PCT/KR2016/000600, filed on Jan. 20, 2016, which claims priority under 35 U.S.C. 119(e) to U.S. Provisional Application No. 62/132,518, filed on Mar. 13, 2015, all of which are hereby expressly incorporated by reference into the present application.

TECHNICAL FIELD

The following description relates to a wireless communication system, and more particularly, to a method for measuring Doppler spread in a wireless LAN system and a device therefor.

BACKGROUND ART

An ultrahigh frequency wireless communication system based on mmWave is configured to operate at a center frequency of several GHz to several tens of GHz. Doppler effect generated by movement of a UE or carrier frequency offset (CFO) generated by a difference in oscillators between a UE and a BS occurs more seriously due to the characteristic of the center frequency configured at an ultrahigh frequency. This is because that the Doppler effect is characterized in linearly increased with respect to the center frequency and CFO expressed by ppm ($10^-6$) is also characterized in linearly increased with respect to the center frequency.

In a cellular network of the related art, a transmitter transmits a reference symbol, and a receiver estimates and compensates for CFO by using the reference symbol. Therefore, in the ultrahigh frequency wireless communication system, another method for estimating/compensating for CFO generated more significantly than the related art should be suggested.

DISCLOSURE

Technical Problem

An object of the present invention devised to solve the aforementioned technical problem is to efficiently measure Doppler effect in a communication system that uses an ultrahigh frequency band.

Another object of the present invention to measure Doppler spread at low complexity through a receiver by using a relation between CFO and Doppler.

Other object of the present invention is to minimize the probability that a receiver loses a plurality of signals at the same time by feeding information on Doppler spread back to a transmitter.

The technical problems solved by the present invention are not limited to the above technical problems and other technical problems which are not described herein will become apparent to those skilled in the art from the following description.

Technical Solution

To achieve the above objects, a method for measuring Doppler spread through a receiver in a wireless communication system comprises the steps of receiving a plurality of received signals that arrive via different paths corresponding to different resource element (RE) sets; measuring CFO (Carrier Frequency Offset) values of the plurality of received signals; selecting two received signals, which have the greatest difference in the CFO values, from the plurality of received signals; and determining a Doppler shift difference between the selected two received signals as effective Doppler spread.

The selected two received signals may be two signals having the lowest probability to be blocked simultaneously.

Respective precoders different from each other may be applied to the different RE sets.

The method for measuring Doppler spread may further comprise the step of transmitting feedback information on the selected two received signals to a transmitter.

The measuring step may include measuring CFO values of the received signals, each of which has received strength of a threshold value or more, among the plurality of received signals.

The method for measuring Doppler spread may further comprise the steps of measuring CFO of a reference signal; comparing the CFO of the reference signal with a CFO value of each of the plurality of received signals; and determining the compared result as a Doppler shift value of the received signal, wherein the reference signal may be a PSS (Primary Synchronization Signal), an SSS (Secondary Synchronization Signal), or CP (Cyclic Prefix).

To achieve the above objects, a reception module comprises a transmitter; a receiver; and a processor operated by being connected with the transmitter and the receiver, wherein the processor controls the receiver to receives a plurality of received signals that arrive via different paths corresponding to different resource element (RE) sets, measures CFO (Carrier Frequency Offset) values of the plurality of received signals, selects two received signals, which have the greatest difference in CFO values, from the plurality of received signals, and determines a Doppler shift difference between the selected two received signals as effective Doppler spread.

Advantageous Effects

According to the embodiments of the present invention, the following effects may be expected.

First of all, an influence due to Doppler effect may be measured exactly in an ultrahigh frequency band communication system.

Secondly, an influence of Doppler spread is measured using a procedure of measuring CFO, whereby complexity required for a receiver is very low.

Thirdly, the receiver may stably receive a signal in various communication environments.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

BRIEF DESCRIPTION OF THE DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR CARRYING OUT THE INVENTION

Figure 1:
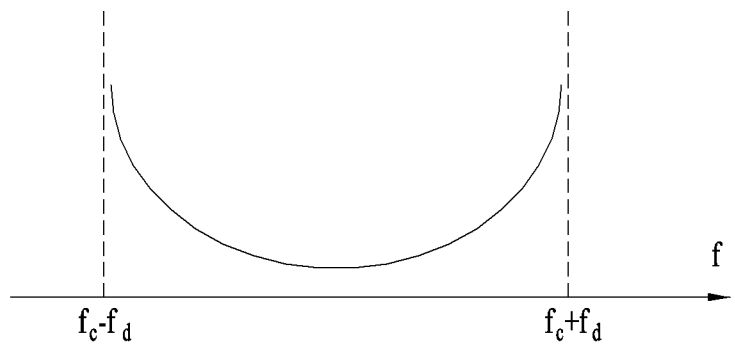
FIG. 1 is a diagram illustrating a Doppler spectrum.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

In this document, the embodiments of the present invention have been described centering on a data transmission and reception relationship between a mobile station and a base station. The base station may mean a terminal node of a network which directly performs communication with a mobile station. In this document, a specific operation described as performed by the base station may be performed by an upper node of the base station.

Namely, it is apparent that, in a network comprised of a plurality of network nodes including a base station, various operations performed for communication with a mobile station may be performed by the base station, or network nodes other than the base station. The term base station may be replaced with the terms fixed station, Node B, eNode B (eNB), advanced base station (ABS), access point, etc.

The term mobile station (MS) may be replaced with user equipment (UE), subscriber station (SS), mobile subscriber station (MSS), mobile terminal, advanced mobile station (AMS), terminal, etc.

A transmitter refers to a fixed and/or mobile node for transmitting a data or voice service and a receiver refers to a fixed and/or mobile node for receiving a data or voice service. Accordingly, in uplink, a mobile station becomes a transmitter and a base station becomes a receiver. Similarly, in downlink transmission, a mobile station becomes a receiver and a base station becomes a transmitter.

Communication of a device with a "cell" may mean that the device transmit and receive a signal to and from a base station of the cell. That is, although a device substantially transmits and receives a signal to a specific base station, for convenience of description, an expression "transmission and reception of a signal to and from a cell formed by the specific base station" may be used. Similarly, the term "macro cell" and/or "small cell" may mean not only specific coverage but also a "macro base station supporting the macro cell" and/or a "small cell base station supporting the small cell".

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. Doppler Spread

In an LTE (Long Term Evolution)/LTE-A (LTE Advanced) system, an error value of oscillators between a UE and an eNB is defined by requirements as follows.

UE side frequency error (in TS 36.101)

The UE modulated carrier frequency shall be accurate to within ±0.1 PPM observed over a period of one time slot (0.5 ms) compared to the carrier frequency received from the E-UTRA Node B eNB side frequency error (in TS 36.104)

Frequency error is the measure of the difference between the actual BS transmit frequency and the assigned frequency.

Meanwhile, oscillator accuracy according to types of BS is as listed in Table 1 below.

TABLE 1

| BS class | Accuracy |
|---|---|
| Wide Area BS | ±0.05 ppm |
| Local Area BS | ±0.1 ppm |
| Home BS | ±0.25 ppm |

Therefore, a maximum difference in oscillators between a BS and a UE is ±0.1 ppm, and when an error occurs in one direction, an offset value of maximum 0.2 ppm may occur. This offset value is converted to a unit of Hz suitable for each center frequency by being multiplied by the center frequency.

Meanwhile, in an OFDM system, a CFO value is varied depending on a subcarrier spacing. Generally, the OFDM system of which subcarrier spacing is sufficiently great is relatively less affected by even a great CFO value. Therefore, an actual CFO value (absolute value) needs to be expressed as a relative value that affects the OFDM system. This will be referred to as normalized CFO. The normalized CFO is expressed as a value obtained by dividing the CFO value by the subcarrier spacing. The following Table 2 illustrates CFO of an error value of each center frequency and oscillator and normalized CFO.

TABLE 2

| Center frequency | Oscillator Offset | | | |
|---|---|---|---|---|
| (subcarrier spacing) | ±0.05 ppm | ±0.1 ppm | ±10 ppm | ±20 ppm |
| 2 GHz (15 kHz) | ±100 Hz (±0.0067) | ±200 Hz (±0.0133) | ±20 kHz (±1.3) | ±40 kHz (±2.7) |
| 30 GHz (104.25 kHz) | ±1.5 kHz (±0.014) | ±3 kHz (±0.029) | ±300 kHz (±2.9) | ±600 kHz (±5.8) |
| 60 GHz (104.25 kHz) | ±3 kHz (±0.029) | ±6 kHz (±0.058) | ±600 kHz (±5.8) | ±1.2 MHz (±11.5) |

In Table 2, it is assumed that a subcarrier spacing is 15 kHz when the center frequency is 2 GHz (for example, LTE Rel-8/9/10). When the center frequency is 30 GHz or 60 GHz, a subcarrier spacing of 104.25 kHz is used, whereby throughput degradation is avoided considering Doppler effect for each center frequency. The above Table 2 is a simple example, and it will be apparent that another subcarrier spacing may be used for the center frequency.

Meanwhile, Doppler spread occurs significantly in a state that a UE moves at high speed or moves at a high frequency band. Doppler spread causes spread in a frequency domain, whereby distortion of a received signal is generated in view of the receiver. Doppler spread may be expressed as $f_{doppler} = (v/\lambda)\cos\theta$. At this time, v is a moving speed of the UE, and $\lambda$ means a wavelength of a center frequency of a radio wave which is transmitted. $\theta$ means an angle between the radio wave and a moving direction of the UE. Hereinafter, description will be given on the assumption that $\theta$ is 0.

At this time, a coherence time is inverse proportion to Doppler spread. If the coherence time is defined as a time spacing of which correlation value of a channel response in a time domain is 50% or more, the coherence time is expressed as $$T_c \approx \frac{9}{16\pi f_{doppler}}.$$

In the wireless communication system, the following Equation 1 which indicates a geometric mean between an equation for Doppler spread and an equation for the coherence time is used mainly.

$$T_c = \sqrt{\frac{9}{16\pi f_{doppler}}} = \frac{0.423}{f_{doppler}} \quad \text{[Equation 1]}$$

FIG. 1 is a diagram illustrating a Doppler spectrum.

A Doppler spectrum or Doppler power spectrum density, which indicates a change of a Doppler value according to a frequency change, may have various shapes depending on a communication environment. Generally, in an environment, such as downtown area, where scattering occurs frequently, if received signals are received at the same power in all directions, the Doppler spectrum is indicated in the form of U-shape as shown in FIG. 1. FIG. 1 shows a U-shaped Doppler spectrum when the center frequency is $f_c$ and a maximum Doppler spread value is $f_d$.

Figure 2:
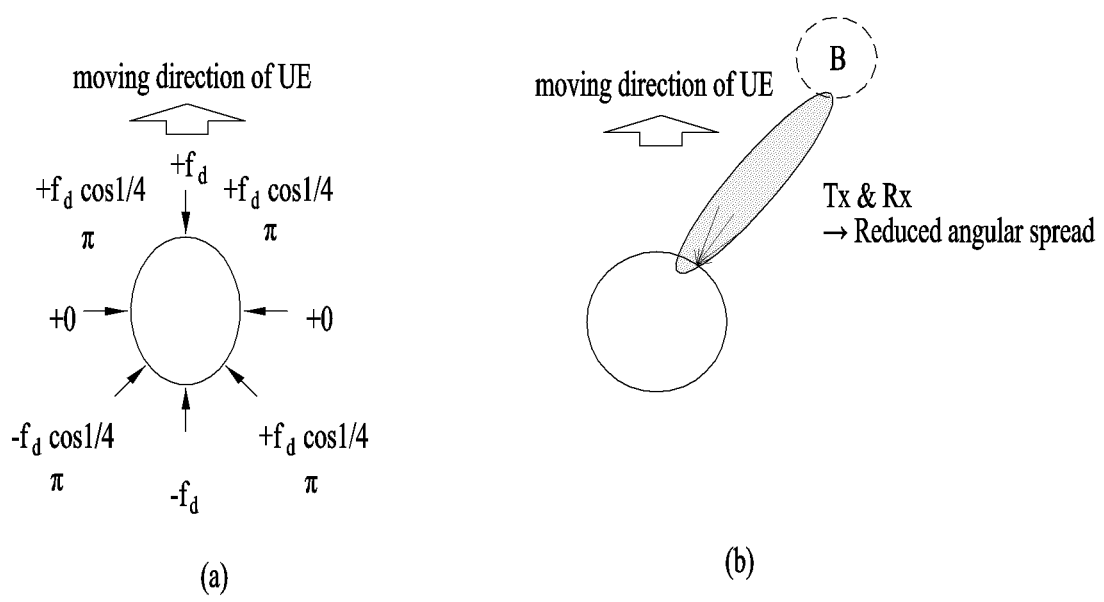
FIG. 2 is a diagram illustrating narrow beamforming related to the present invention.
Figure 3:
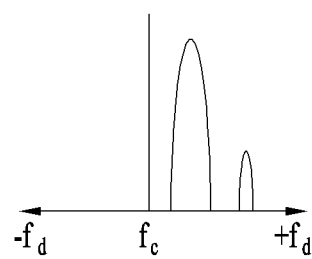
FIG. 3 is a diagram illustrating a Doppler spectrum when narrow beamforming is performed.

FIG. 2 is a diagram illustrating narrow beamforming related to the present invention, and FIG. 3 is a diagram illustrating a Doppler spectrum when narrow beamforming is performed.

In the ultrahigh frequency wireless communication system, since the center frequency is located at a very high band, a size of an antenna is small and an antenna array comprised of a plurality of antennas may be installed in a small space. This characteristic enables pin-point beamforming, pencil beamforming, narrow beamforming, or sharp beamforming, which is based on several tens of antennas to several hundreds of antennas. This narrow beamforming means that a received signal is received at a certain angle only not a constant direction.

FIG. 2(a) illustrates that a Doppler spectrum is represented in the form of U-shape depending on a signal received in a constant direction, and FIG. 2(b) illustrates that narrow beamforming based on a plurality of antennas is performed.

As described above, if narrow beamforming is performed, the Doppler spectrum is represented to be narrower than U-shape due to reduced angular spread. As shown in FIG. 3, it is noted from the Doppler spectrum when narrow beamforming is performed that Doppler spread is generated at a certain band only.

Figure 4:
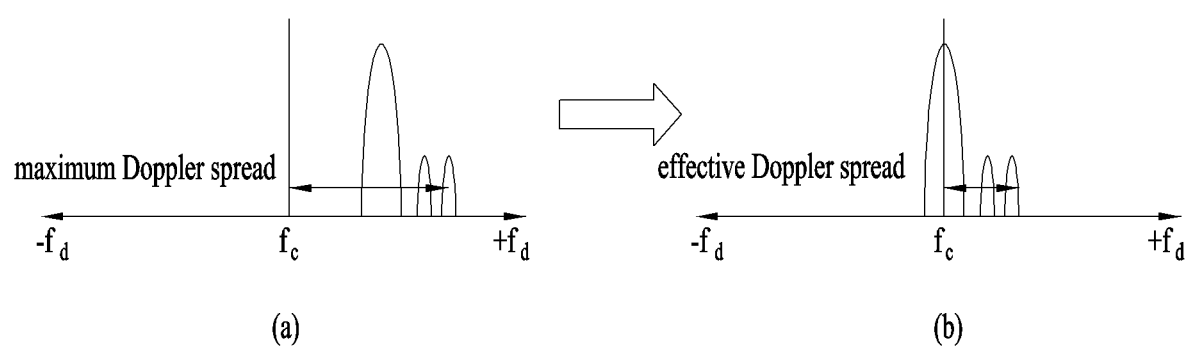
FIG. 4 is a diagram illustrating that effective Doppler spread is controlled by compensation for a Doppler shift value.

FIG. 4 is a diagram illustrating that effective Doppler spread is controlled by compensation for a Doppler shift value.

As described above, Doppler isolation is generated in the ultrahigh frequency band due to beamforming, and a value of Doppler spread may be compensated to increase the coherence time. That is, as shown in FIG. 4(a), if maximum Doppler spread is measured, a Doppler shift value is compensated, whereby effective Doppler spread is lowered as shown in FIG. 4(b), and thus overhead for channel estimation may be lowered.

Alternatively, if Doppler isolation is used at an ultrahigh frequency band, the receiver may select beams suitable for quality requirements by measuring a value of Doppler spread according to beamforming (see U.S. application Ser. No. 62/129,017). Hereinafter, such a beam selection procedure will be described.

Figure 5:
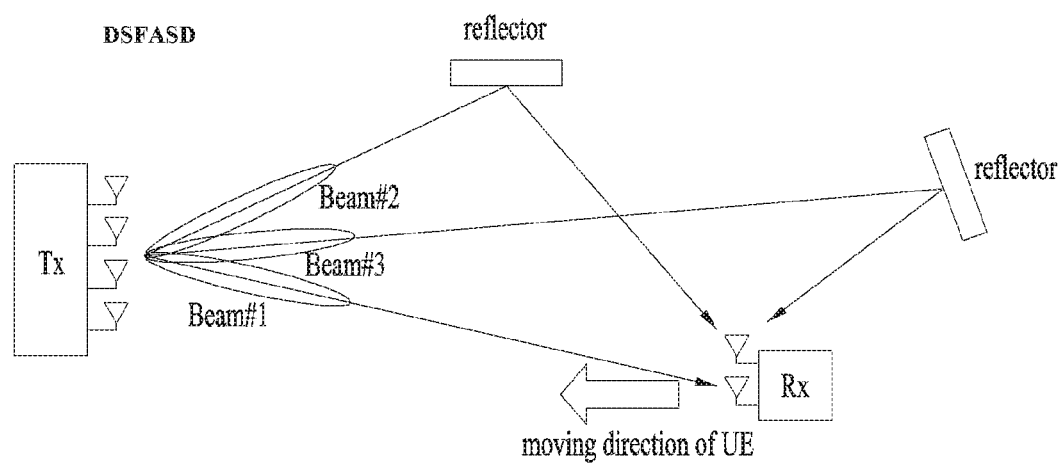
FIG. 5 is a diagram illustrating a beam selection procedure according to movement of a UE.
Figure 6:
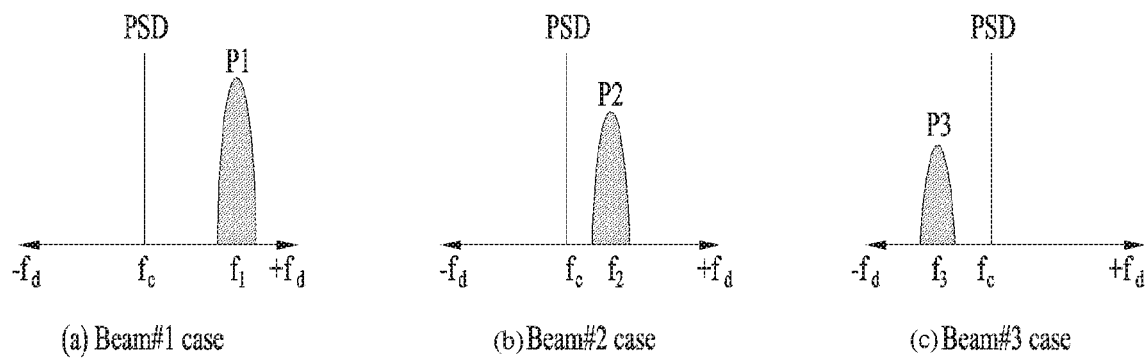
FIG. 6 is a diagram illustrating a Doppler spectrum of beams received in a UE in an environment of FIG. 5.

FIG. 5 is a diagram illustrating a beam selection procedure according to movement of a UE, and FIG. 6 is a diagram illustrating a Doppler spectrum of beams received in a UE in an environment of FIG. 5.

It is assumed that a radio channel between the transmitter and the receiver includes three beams, rays or clusters as shown in FIG. 5. Also, it is considered that the number of beams that may simultaneously be transmitted from the transmitter in accordance with restriction in the number of antennas and RF chains is maximum 2. At this time, the transmitter may select one of maximum 6 types of methods {B1}, {B2}, {B3}, {B1, B2}, {B2, B3}, {B3, B1} in beam selection (B1, B2 and B3 are beam 1, beam 2 and beam 3, respectively).

In the related art, a Doppler spectrum of each beam is not used during such a beam selection procedure and precoding procedure. This is because that Doppler spectrum isolation described with reference to FIG. 3 is not generated at a low frequency band or its level is weak even though the Doppler spectrum isolation is generated. However, in a wireless communication environment that a frequency bandwidth of 10 GHz or more is used, it is expected that a difference in Doppler spectrum in each beam is remarkably generated. For example, it is likely that Doppler spectrums for the respective beams in FIG. 5 are clearly distinguished from one another as shown in FIG. 6. FIGS. 6(a), 6(b) and 6(c) illustrate Doppler spectrums of B1, B2 and B3, respectively. If this channel characteristic is generated, effective Doppler spread characteristic may be changed by the selected beam group.

Meanwhile, as described with reference to FIG. 4, a Doppler shift value is measured and compensated, whereby effective Doppler spread may be reduced. If effective Doppler spread is reduced, time selectivity is relatively smaller, whereby overhead for channel estimation becomes smaller. On the other hand, time diversity effect is reduced, whereby outage performance may be degraded. That is, trade-off between resource efficiency and outage performance is generated by effective Doppler spread. If resource efficiency is enhanced, system overhead is relatively lowered, whereby the above trade-off may be construed as issue of average performance to outage performance or throughput to reliability in view of the aspect that average system throughput is improved.

Figure 7:
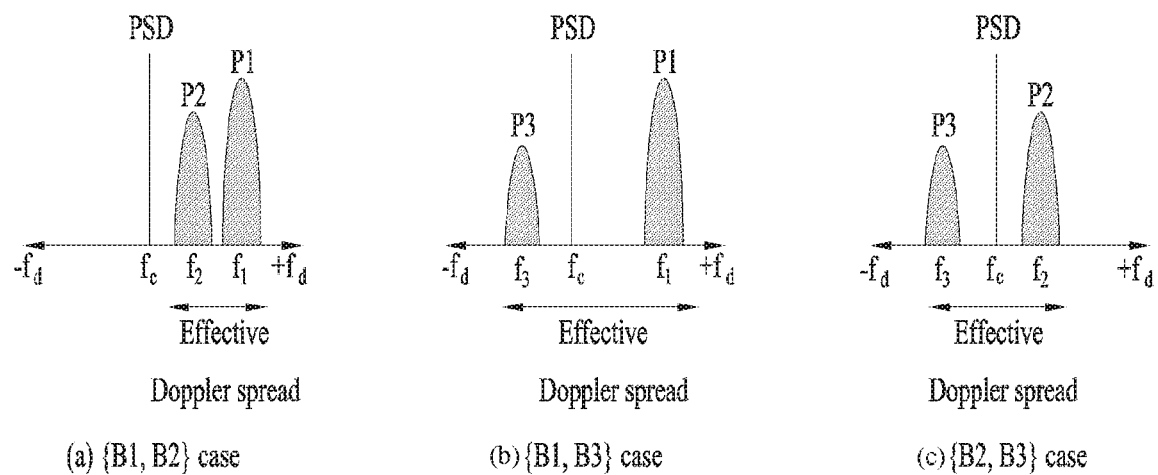
FIG. 7 is a diagram illustrating a Doppler spectrum when a UE selects two beams in an environment of FIG. 5.
Figure 8:
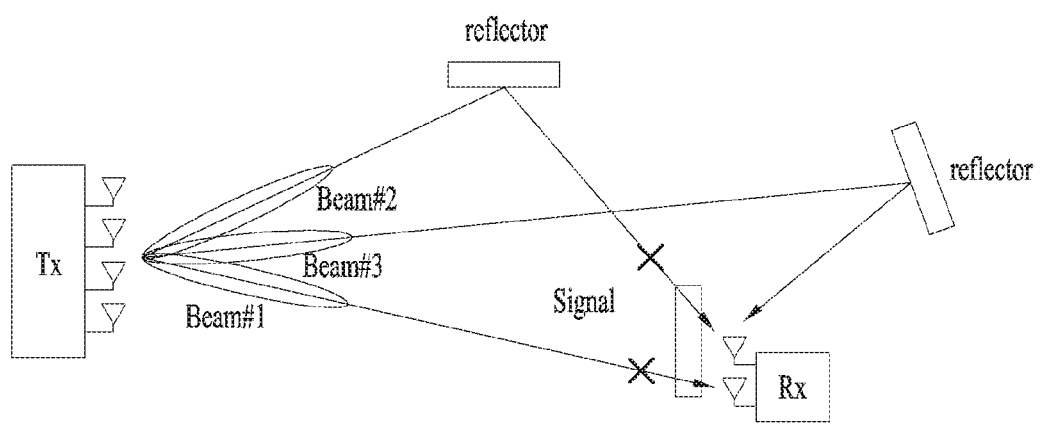
FIG. 8 is a diagram illustrating an environment that beams received in a UE are blocked in an environment of FIG. 5.

FIG. 7 is a diagram illustrating a Doppler spectrum when a UE selects two beams in an environment of FIG. 5. FIG. 8 is a diagram illustrating an environment that beams received in a UE are blocked in an environment of FIG. 5.

Meanwhile, when an angle between a moving direction of the receiver and beam is θ, a Doppler value is proportional to cos(θ). That is, it may be understood that an incident angle difference between beams is great if effective Doppler spread is generated at a wide range. Therefore, even though reception of a signal is suddenly blocked in a specific direction with respect to the receiver, it is likely that reception of another signal is not blocked.

FIG. 7 illustrates that effective Doppler spread becomes greater if the receiver selects two beams. Effective Doppler spread is the greatest in combination of {B1, B3} shown in FIG. 7(b), and the transmitter selects combination of {B1, B3} and then transmits a signal to the receiver.

In this case, since the selected beam combination is combination having a beamforming direction which is most spread, even though B1 and B2 are simultaneously blocked by an obstacle as shown in FIG. 8, a signal in a direction supported by B3 is still transmitted to the receiver.

On the other hand, combination of {B1, B3} may not be optimal beam combination in view of SNR, SINR, throughput or communication capacity. That is, since combination of {B1, B2} has less interference between beams in view of simultaneous transmission of two beams and power gain (P2 in FIG. 6) corresponding to B2 may be greater than power gain (P3 in FIG. 6) corresponding to B3, combination of {B1, B2} may be optimal combination in view of communication capacity. Also, if it is intended to reduce channel estimation overhead through a scheme for compensating for a Doppler value to improve throughput, a scheme for selecting only one beam and transmitting the selected beam may be more favorable.

If the transmitter transmits a signal by selecting two specific beams, it is supposed that an event that the ith beam is blocked is $B_i$ and an event that the ith beam is not blocked is $B_i^C$. In this case, the probability that a data packet intended to be transmitted by the transmitter is not transmitted to the receiver is generated as expressed by the following Equation 2.

$$P_e = Pr(\text{error}|B_1,B_2)Pr(B_1,B_2) + Pr(\text{error}|B_1,B_2^C)Pr(B_1,B_2^C) + Pr(\text{error}|B_1^C,B_2)Pr(B_1^C,B_2) + Pr(\text{error}|B_1^C,B_2^C)Pr(B_1^C,B_2^C)$$ [Equation 2]

At this time, a relation expressed by the following Equation 3 is generally formed.

$$Pr(\text{error}|B_1,B_2) \gg Pr(\text{error}|B_1,B_2^C), Pr(\text{error}|B_1^C,B_2) \gg Pr(\text{error}|B_1^C,B_2^C)$$ [Equation 3]

For a service that requires very high reliability, an MCS (Modulation and Coding Scheme) level is controlled such that a value of $Pr(\text{error}|B_1^C,B_2^C)$ is set to be close to 0 ($Pr(\text{error}|B_1^C, B_2^C)=10^{-6}$). However, even in this environment, a value of $Pr(\text{error}|B_1,B_2)$ is close to 1 toward a high frequency band where a difference in path loss between LoS/NLoS(Line of Sight/Non Line of Sight) is generated greatly. Therefore, a term that most dominantly affects an entire error probability becomes $Pr(B_1, B_2)$ which is the probability that two beams will be blocked. This probability is finally equal to $Pr(B_2|B_1)Pr(B_1)$. Also, it is assumed that the probability that one beam will be blocked is equal to all beams regardless of types of beams ($Pr(B_1)=Pr(B_2)=$Constant). In this case, when one beam is blocked, it is noted that an entire error rate is determined in accordance with the probability that another beam will be blocked simultaneously with the one beam. Therefore, a method for selecting beam combination having the lowest probability that beams will be blocked simultaneously by analyzing Doppler spectrums will be proposed hereinafter.

2. Proposed Method for Estimating Doppler Spread

Figure 9:
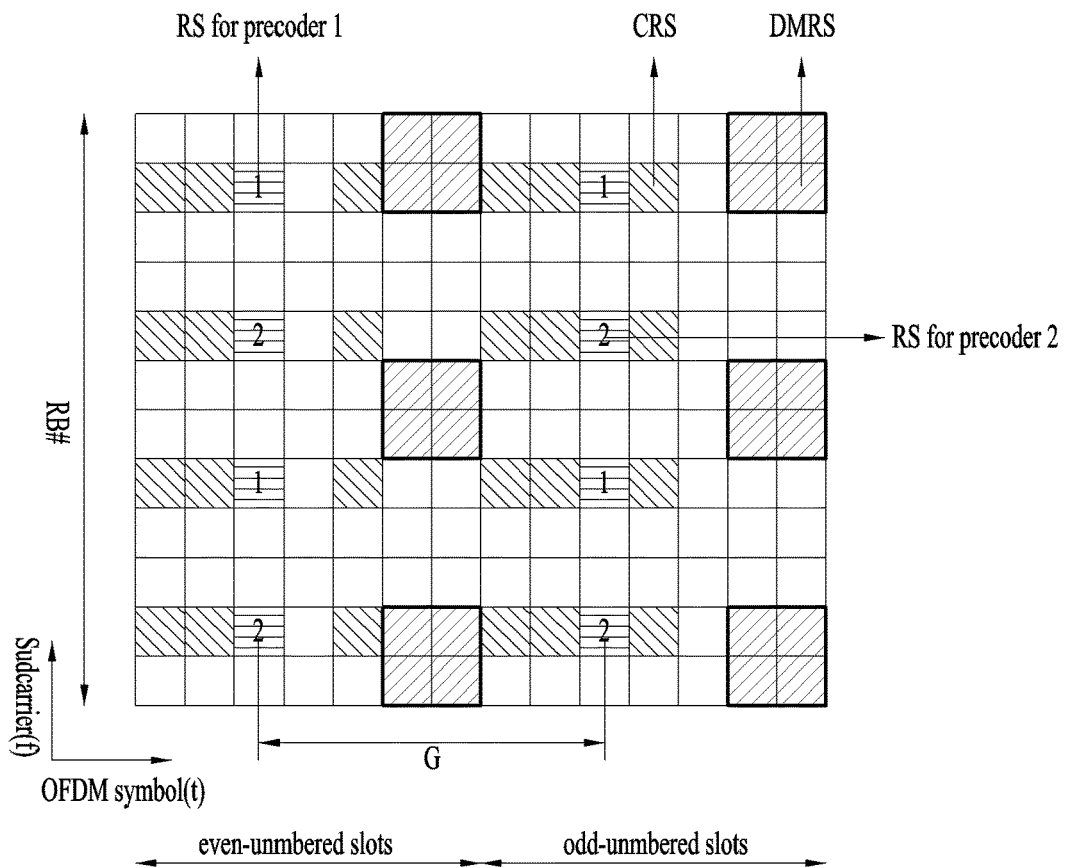
FIG. 9 is a diagram illustrating a procedure of estimating Doppler spread according to the proposed embodiment.

FIG. 9 is a diagram illustrating a procedure of estimating Doppler spread according to the proposed embodiment.

Generally, a Doppler spectrum is obtained in such a manner that FFT is performed for received signals to calculate auto-correlation. At this time, Doppler shift of all beams carried in the received signals is generated in the Doppler spectrum. For example, if the received signals are received through beams B1 and B2 in FIG. 7, the Doppler spectrum is generated as shown in FIG. 7(a). However, a problem occurs in that the receiver cannot identify whether f1 of FIG. 7(a) is B1 or B2 even though the Doppler spectrum is obtained. To estimate a Doppler shift value of each beam through the Doppler spectrum, one received signal should be received by only one beam as shown in FIG. 6. Therefore, to estimate Doppler shift values of beams having different directions, OFDM symbols equivalent to the number of the beams are required. That is, more resources are required in view of the receiver.

Meanwhile, CFO is generated by Doppler spread and a frequency difference in oscillators between the transmitter and the receiver. At this time, since CFO is estimated for each frequency bandwidth, if beams having different directions are transmitted through different frequency bandwidths, CFO values of the respective beams may be estimated respectively.

Based on this, a method for estimating effect Doppler spread even by using small resources will be proposed.

According to one embodiment, the receiver respectively estimates CFO values of beams having different directions. Subsequently, the receiver calculates Doppler shift difference and effective Doppler spread of the beams from the estimated CFO values. The receiver may select two or more beams having the lowest probability that the beams will be blocked simultaneously, from the calculated value.

In more detail, the beams transmitted in their respective directions different from one another reach the receiver through their respective paths different from one another as described with reference to FIG. 5. At this time, since the three beams enter the receiver in their respective directions different from one another, Doppler values of the respective beams are obtained differently from one another. Meanwhile, normalized CFO($\epsilon_n$) calculated at the nth beam is defined as expressed by the following Equation 4.

$$\epsilon_n \triangleq \frac{f_0^T - f_0^R + \beta_n f_0^T}{\Delta f} = \epsilon_c + \epsilon'_n \quad \text{[Equation 4]}$$

where $$\beta_n \triangleq \frac{v}{c}\cos\theta_n,$$

$$\epsilon_c \triangleq \frac{f_0^T - f_0^R}{\Delta f}, \epsilon'_n \triangleq \frac{\beta_n f_0^T}{\Delta f}$$

In the Equation 4, $f_0^T$, $f_0^R$ respectively indicate oscillator frequencies of the transmitter and the receiver. $\Delta F$ means a subcarrier spacing, v means a moving speed of the UE, c means velocity of light, and $\theta_n$ means an incident angle of beam. The Equation 4 indicates that $\epsilon_n$ includes $\epsilon_c$ irrelevant to a beam direction and $\epsilon'_n$ determined by a beam direction. Based on the Equation 4, a Doppler shift difference ($\Delta\epsilon_{m,n}$) between the beams may be derived as expressed by the following Equation 5.

$$\Delta\epsilon_{m,n} \triangleq \epsilon_m - \epsilon_n = \epsilon'_m - \epsilon'_n = c(\beta_m - \beta_n) \quad \text{[Equation 5]}$$

where $c = \frac{f_0^T}{\Delta f}$

It is noted from the Equation 5 that a difference of CFO values may be expressed as a difference (that is, Doppler shift difference) of Doppler values. Meanwhile, effective Doppler spread is calculated by multiplying subcarrier spacing $\Delta f$ by the Doppler shift difference as expressed by the following Equation 6.

$$D_{m,n}^e \triangleq \Delta\epsilon_{m,n} \Delta f \quad \text{[Equation 6]}$$

For example, effective Doppler spread in FIG. 7(b) is defined as $D_{1,3}^e \triangleq |f_0^T \beta_1 - f_0^T \beta_3|$, and then may be expressed by the following Equation 7.

$$D_{1,3}^e = |f_0^T \beta_1 - f_0^T \beta_3| = |\Delta f \Delta\epsilon_{1,3}| \quad \text{[Equation 7]}$$

As a result, the Doppler shift difference ($D_{1,3}^e$) is calculated using the CFO difference of the beams, whereby the receiver may exactly calculate effective Doppler spread of the selected two beams.

Meanwhile, although the embodiment that effective Doppler spread is calculated using the normalized CFO value has been described as above, the present invention is not limited to this embodiment. That is, CFO is defined as expressed by the following Equation 8, and satisfies $\chi_n = \Delta f \epsilon_n$.

$$\chi_n \triangleq f_0^T - f_0^R + \beta_n f_0^T \quad \text{[Equation 8]}$$

At this time, effective Doppler spread is calculated as $D_{m,n}^e = |\chi_m - \chi_n|$. That is, the aforementioned procedure of measuring effective Doppler spread may be applied to even the case which does not correspond to the normalized CFO.

Before measuring effective Doppler spread of the two beams selected as above, the receiver may measure effective Doppler spread by selecting two beams having the greatest CFO difference value. That is, this is because that it is expected that two beams having the greatest CFO difference value will have the greatest Doppler shift difference. Therefore, if signals are received in three or more beams, the Doppler spectrum is determined using the beams having the greatest CFO difference value.

In addition to the above embodiment, the receiver may select two beams having the greatest CFO difference from the beams received at strength of a specific value or more. That is, a reference of candidate values for measurement of effective Doppler spread may be received strength of the signal.

The method for estimating Doppler spread has been conceptually described as above, and its details will now be described with reference to FIG. 9. FIG. 9 illustrates a resource block (RB) defined in LTE/LTE-A. The RB includes resource elements (REs) defined as OFDM symbols and subcarriers. In FIG. 9, REs marked with oblique lines indicate CRS (cell-specific RS) or DMRS (Demodulation RS). Also, '1' and '2' stated in the REs respectively indicate RE set, and each RE set means a set of two or more REs. The transmitter performs beamforming by using the same precoder with respect to the same RE set.

First of all, the transmitter performs beamforming having different directions corresponding to different RE sets, respectively. The receiver may estimate CFO values of beams incident through the RE set, and may calculate Doppler shift difference and/or effective Doppler spread of the beams from the estimated values.

Since the first RE set and the second RE set use their respective precoders different from each other, the beam received through the first RE set and the beam received through the second RE set have their respective directions different from each other. If a pilot signal previously known by the receiver is transmitted by being carried in the RE set, CFO value of each beam is estimated in accordance with the following Equation 9.

$$\hat{\epsilon}_n = \angle \left( \sum_{i=1}^{N_r} \left\{ \sum_{k \in D_{n,l}} r_{k,i}^{l+G} (r_{k,j}^{l})^* (s_k^{l+G})^* s_k^l \right\} \right) \times \frac{N}{2\pi G(N + N_g)} \quad \text{[Equation 9]}$$

In the Equation 9, $r_{k,i}^l$ means a received signal of the ith receiving antenna at the kth RE of the lth OFDM symbol. $S_k^l$ indicates the pilot signal transmitted by the transmitter at the kth RE of the lth OFDM symbol. N indicates an OFDM symbol length, and $N_g$ indicates CP (Cyclic Prefix). $N_r$ indicates the number of receiving antennas of the receiver, and $D_{n,l}$ indicates index set of REs that use the nth precoder at the lth OFDM symbol. Finally, G indicates a distance between REs located at different OFDM symbols and the same subcarrier, to which the same precoder is applied.

The receiver may calculate Doppler shift difference between the beams by using the Equation 5 after estimating CFO value of each beam by using the Equation 9. Effective Doppler spread may be calculated together with (or instead of) the Doppler shift difference.

According to another embodiment, the receiver may estimate reference CFO from all received signals or broadcast signal. Subsequently, the receiver may estimate CFO from the pilot signal received per RE set and calculate Doppler shift value and/or effective Doppler spread by comparing the estimated CFO with the reference CFO.

In more detail, first of all, the Doppler shift value according to beamforming is defined by a difference between a center frequency $f_c^{ref}$ and a frequency $f_c^{beam}$ changed by beamforming as expressed by the following Equation 10.

$$f_{DS,beam} \triangleq f_c^{ref} - f_c^{beam} \quad \text{[Equation 10]}$$

At this time, the receiver may estimate CFO by using a broadcast signal (for example, PSS (Primary Synchronization Signal) or SSS (Secondary Synchronization Signal)) or all received signals (for example, CP). The CFO measured by the reference signals is defined as $\epsilon_{ref}$. Subsequently, the receiver corrects the center frequency by using $\epsilon_{ref}$ as expressed by the following Equation 11.

$$f_c^{ref} = f_c^R + \epsilon_{ref} \Delta f \quad \text{[Equation 11]}$$

In the Equation 11, $f_c^R$ indicates the original center frequency of the receiver. At this time, the receiver knows only a value of $\epsilon_{ref}$, and cannot know $f_c^{ref}$ and $f_c^R$. Meanwhile, CFO estimated through RE set beamformed through a specific precoder is defined as $\epsilon_{beam}$. At this time, $f_c^{beam}$ is expressed by the following Equation 12.

$$f_c^{beam} = f_c^R + \epsilon_{beam} \Delta f \quad \text{[Equation 12]}$$

In the Equation 12, the receiver knows only a value of $\epsilon_{beam}$, and cannot know $f_c^{beam}$ and $f_c^R$ similarly to the Equation 11. From the Equation 11 and the Equation 12, the Doppler shift value defined in the Equation 10 is expressed by the following Equation 13.

$$\begin{aligned} f_{DS,beam} &\triangleq f_c^{ref} - f_c^{beam} \\ &= (f_c^R + \Delta f \epsilon_{ref}) - (f_c^R + \Delta f \epsilon_{beam}) \\ &= \Delta f (\epsilon_{ref} - \epsilon_{beam}) \end{aligned} \quad \text{[Equation 13]}$$

It is noted from the Equation 13 that the Doppler shift difference according to beamforming is the same as the difference between CFO measured by the reference signal and CFO estimated from the RE set subjected to beamforming. That is, the receiver may respectively calculate the Doppler shift values by using $\epsilon_{ref}$ and $\epsilon_{beam}$ even though the receiver cannot know $f_c^{beam}$ and $f_c^R$ directly. In this embodiment, not the Doppler shift difference but the Doppler shift value of each beam is calculated using the reference signal. If the Doppler shift values of the two beams are calculated, the Doppler shift difference is obtained naturally.

Meanwhile, the receiver selects two beams having the greatest Doppler shift difference in accordance with the embodiments described as above. The selected two beams correspond to combination of beams having the lowest probability that the beams will be blocked simultaneously, and the receiver may transmit information on the selected beams to the transmitter.

As described above, although the multiple beams are transmitted through one antenna array as an example, this example may similarly be applied to even the case that a part of the antenna array transmits one beam. At this time, each beam is understood as a transmission beam of each subarray.

Figure 10:
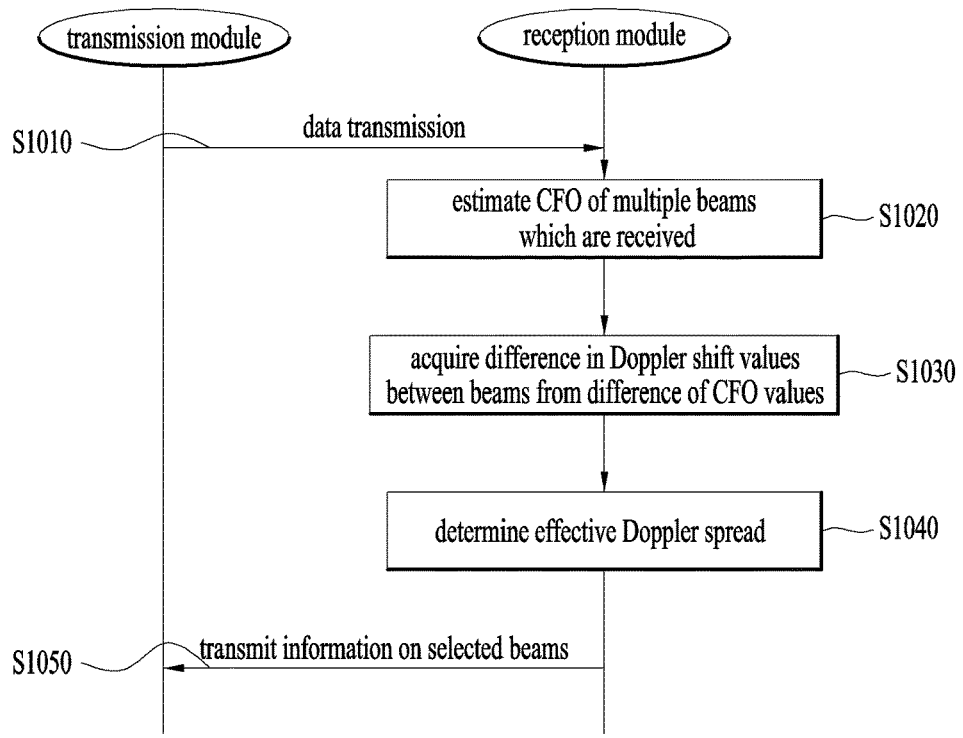
FIG. 10 is a flow chart illustrating a method for estimating Doppler spread according to the proposed embodiment.

FIG. 10 is a flow chart illustrating a method for estimating Doppler spread according to the proposed embodiment. In FIG. 10, the aforementioned embodiments are shown in accordance with a time sequential flow. Therefore, although not shown or described in detail, the aforementioned embodiments may equally or similarly be applied to the method of FIG. 10.

First of all, the transmitter transmits data to the receiver (S1010). The step of S1010 may be understood as a step of transmitting multiple beams having their respective directions different from one another through multiple RE sets from the transmitter.

The receiver respectively estimates CFO values of the received beams (S1020). Subsequently, the receiver calculates difference between the Doppler shift values of the beams by calculating the difference between estimated CFO values of two random beams (S1030). This procedure may be performed in such a manner that the steps of selecting two beams from the multiple beams and calculating the shift value difference are repeated. As a result of calculation, the receiver selects two beams having the greatest Doppler shift value difference, and at this time, the Doppler shift value difference becomes effective Doppler spread (S1040).

Finally, the receiver transmits information on the selected two beams to the transmitter by feedback (S1050). Although not shown explicitly, the transmitter may perform precoding for next data transmission on the basis of the information received from the receiver.

Meanwhile, the embodiments proposed as above may be applied downlink/uplink in BS-UE communication, and may be applied to D2D communication (or sidelink) in UE-UE communication.

Also, the aforementioned beamforming procedure may be applied to analog/digital beamforming or precoding for multiple antennas. If feedback information transmitted from the receiver to the transmitter is applied to the broadband system, the aforementioned beamforming procedure may be implemented as a procedure of transmitting separate feedback information for each of a plurality of frequency domains (subband, sub-carrier, resource block, etc.). Alternatively, feedback information may be transmitted to only a specific frequency domain designated by the receiver or the transmitter.

3. Apparatus Configuration

Figure 11:
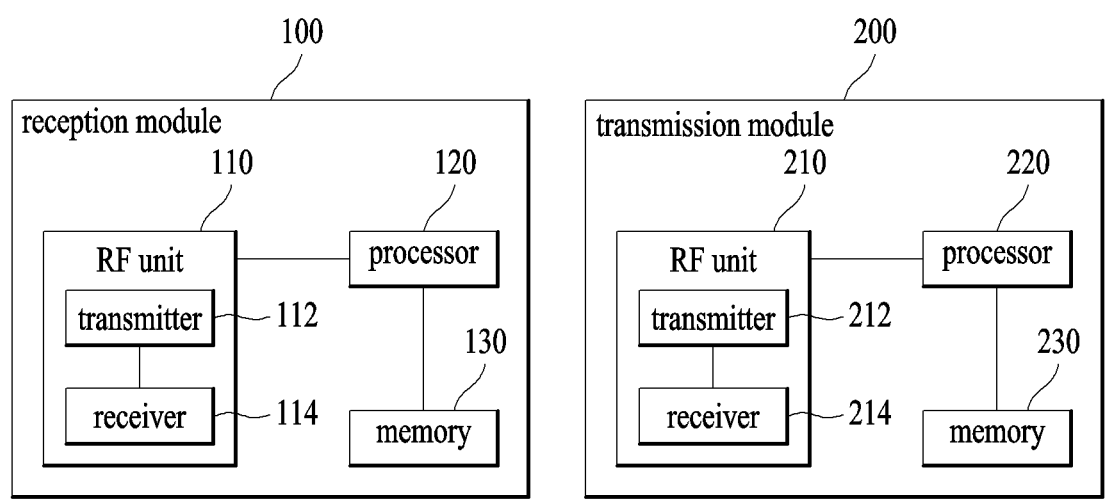
FIG. 11 is a diagram illustrating a configuration of a reception module and a transmission module according to the proposed embodiment.

FIG. 11 is a block diagram showing the configuration of a reception module and a transmission module according to one embodiment of the present invention. In FIG. 11, the reception module 100 and the transmission module 200 may include radio frequency (RF) units 110 and 210, processors 120 and 220 and memories 130 and 230, respectively. Although a 1:1 communication environment between the reception module 100 and the transmission module 200 is shown in FIG. 11, a communication environment may be established between a plurality of reception module and the transmission module. In addition, the transmission module 200 shown in FIG. 11 is applicable to a macro cell base station and a small cell base station.

The RF units 110 and 210 may include transmitters 112 and 212 and receivers 114 and 214, respectively. The transmitter 112 and the receiver 114 of the reception module 100 are configured to transmit and receive signals to and from the transmission module 200 and other reception modules and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the reception module 100 may perform the methods of the various embodiments of the present invention.

The transmitter 212 and the receiver 214 of the transmission module 200 are configured to transmit and receive signals to and from another transmission module and reception modules and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the transmission module 200 may perform the methods of the various embodiments of the present invention.

The processors 120 and 220 of the reception module 100 and the transmission module 200 instruct (for example, control, adjust, or manage) the operations of the reception module 100 and the transmission module 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method may be implemented as programs executable in computers and executed in general computers that operate the programs using computer readable media. In addition, data used in the aforementioned method may be recorded in computer readable recording media through various means. It should be understood that program storage devices that can be used to describe storage devices including computer code executable to perform various methods of the present invention do not include temporary objects such as carrier waves or signals. The computer readable media include storage media such as magnetic recording media (e.g. ROM, floppy disk and hard disk) and optical reading media (e.g. CD-ROM and DVD).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

Although the aforementioned method for estimating CFO has been described based on the 3GPP LTE/LTE-A system, the aforementioned method is applicable to various wireless communication systems that include IEEE 802.16 system.

The invention claimed is:

1. A method for measuring Doppler spread by a receiver in a wireless communication system, the method comprising:
    receiving a plurality of received signals that arrive via different paths corresponding to different resource element (RE) sets;
    measuring CFO (Carrier Frequency Offset) values of the plurality of received signals;
    selecting two received signals, which have a greatest difference in the CFO values, from the plurality of received signals; and
    determining a Doppler shift difference between the selected two received signals as effective Doppler spread.

2. The method according to claim 1, wherein the selected two received signals are two signals having a lowest probability to be blocked simultaneously.

3. The method according to claim 1, wherein different precoders are applied to the different RE sets, respectively.

4. The method according to claim 1, further comprising: transmitting feedback information on the selected two received signals to a transmitter.

5. The method according to claim 1, wherein the measuring comprises measuring CFO values of the received signals, each of which has received strength of a threshold value or more, among the plurality of received signals.

6. The method according to claim 1, further comprising:
    measuring CFO of a reference signal;
    comparing the CFO of the reference signal with a CFO value of each of the plurality of received signals; and
    determining the compared result as a Doppler shift value of the received signal,
    wherein the reference signal is a PSS (Primary Synchronization Signal), an SSS (Secondary Synchronization Signal), or CP (Cyclic Prefix).

7. A reception module for estimating Doppler in a wireless communication system, the reception module comprising:
    a transmitter;
    a receiver; and a processor operated by being connected with the transmitter and the receiver, wherein the processor controls the receiver to receive a plurality of received signals that arrive via different paths corresponding to different resource element (RE) sets, measures CFO (Carrier Frequency Offset) values of the plurality of received signals, selects two received signals, which have a greatest difference in the CFO values, from the plurality of received signals, and determines a Doppler shift difference between the selected two received signals as effective Doppler spread.

8. The reception module according to claim 7, wherein the selected two received signals are two signals having a lowest probability to be blocked simultaneously.

9. The reception module according to claim 7, wherein different precoders are applied to the different RE sets, respectively.

10. The reception module according to claim 7, wherein the processor controls the transmitter to transmit feedback information on the selected two received signals.

11. The reception module according to claim 7, wherein the processor measures CFO values of the received signals, each of which has received strength of a threshold value or more, among the plurality of received signals.

12. The reception module according to claim 7, wherein the processor measures CFO of a reference signal, compares the CFO of the reference signal with a CFO value of each of the plurality of received signals, and determines the compared result as a Doppler shift value of the received signal, wherein the reference signal is a PSS (Primary Synchronization Signal), an SSS (Secondary Synchronization Signal), or CP (Cyclic Prefix).

* * * * *